United States Patent
Iesaki

(10) Patent No.: US 8,289,569 B2
(45) Date of Patent: Oct. 16, 2012

(54) ENCODER SIGNAL PROCESSOR, ENCODER SIGNAL PROCESSING METHOD, AND TRANSPORT APPARATUS

(75) Inventor: Kenichi Iesaki, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 442 days.

(21) Appl. No.: 12/718,867

(22) Filed: Mar. 5, 2010

(65) Prior Publication Data

US 2010/0225934 A1 Sep. 9, 2010

(30) Foreign Application Priority Data

Mar. 9, 2009 (JP) .................................. 2009-055566

(51) Int. Cl.
*G06F 15/00* (2006.01)
*B41J 29/38* (2006.01)
(52) U.S. Cl. ............................................. 358/1.5; 347/9
(58) Field of Classification Search .................... 358/1.5; 347/9
See application file for complete search history.

(56) References Cited

U.S. PATENT DOCUMENTS

| | | | |
|---|---|---|---|
| 4,691,170 A | 9/1987 | Riley | |
| 2001/0024101 A1 | 9/2001 | Tanaka | |
| 2007/0024665 A1 | 2/2007 | Igarashi et al. | |
| 2009/0058900 A1* | 3/2009 | Ide et al. ........................... | 347/9 |

FOREIGN PATENT DOCUMENTS

| | | |
|---|---|---|
| JP | S53-122351 A | 10/1978 |
| JP | S55-120220 A | 9/1980 |
| JP | S56-132838 U | 10/1981 |
| JP | S62-213412 A | 9/1987 |
| JP | 2001-219613 A | 8/2001 |
| JP | 2005-091047 A | 4/2005 |
| JP | 2006-119037 A | 5/2006 |
| JP | 2006-168137 A | 6/2006 |
| JP | 2007-031125 A | 2/2007 |
| JP | 2008-068603 A | 3/2008 |

OTHER PUBLICATIONS

Japan Patent Office, Notification of Reason for Refusal for Japanese Patent Application No. 2009-055566 (counterpart to above-captioned patent application), dispatched Dec. 14, 2010.

Japan Patent Office, Notification of Reason for Refusal for Japanese Patent Application No. 2009-055566 (counterpart to above-captioned patent application), dispatched Mar. 22, 2011.

\* cited by examiner

*Primary Examiner* — Saeid Ebrahimi Dehkordy
(74) *Attorney, Agent, or Firm* — Baker Botts L.L.P.

(57) ABSTRACT

An encoder signal processor which processes a pulsed encoder signal output from an encoder in accordance with a travel distance of an object to be detected, including: an increasing and decreasing wave generating unit that generates an increasing and decreasing wave based on the encoder signal output from the encoder; an intermediate pulse signal generating unit that generates a binarized intermediate pulse signal based on the increasing and decreasing wave; and a multiplied pulse signal generating unit that generates a multiplied pulse signal, which is a signal obtained by multiplying the encoder signal by 2, by performing exclusive-OR operation between the encoder signal output from the encoder and the intermediate pulse signal.

10 Claims, 9 Drawing Sheets

ENCODER SIGNAL PROCESSOR, ENCODER SIGNAL PROCESSING METHOD, AND TRANSPORT APPARATUS

CROSS REFERENCE TO RELATED APPLICATION

The present application claims priority from Japanese Patent Application No. 2009-055566, which was filed on Mar. 9, 2009, the disclosure of which is herein incorporated by reference in its entirety.

TECHNICAL FIELD

The apparatuses and devices consistent with the present invention relate to an encoder signal processing method of processing a pulsed encoder signal output from an encoder, an encoder signal processor, and a transport apparatus having the encoder signal processor therein.

BACKGROUND

There is a related art apparatus which is configured to drive an object to be driven with a motor. The related art apparatus includes a position sensor for detecting the position of an object to be driven or the rotation position of a motor and is configured to perform position control and speed control of the motor on the basis of a position detection signal from the position sensor. One example of the related art apparatus is an ink jet printer which forms an image on paper while moving a carriage, which is mounted with a recording head, in a main scanning direction by a motor. Another example of the related art apparatus is a scanner which reads an image of a document while moving a line sensor for image reading in a sub-scanning direction by a motor.

As described above, for the related art apparatuses in which motor control using a position sensor is performed, there is a demand for improvement in the detection accuracy of the position sensor in order to perform motor control with high precision (eventually, in order to control the driving of an object to be driven with high precision).

In the case of controlling the position of a motor on the basis of a position detection result using an encoder, the accuracy of position detection depends on the resolution of the encoder. Accordingly, in order to improve the accuracy of motor control by performing the position detection with high precision, it is necessary to use an encoder with high resolution by reducing a distance between slits.

However, a method of improving the resolution of an encoder by reducing the distance between slits has practical limitations due to manufacturing problems and cost problems.

Therefore, as a method of improving the position detection accuracy of an encoder without improving an encoder wheel or a linear scale which forms the encoder, a method has been proposed in which the encoder slit distance is measured using a sufficiently high-speed clock compared with an interval of an encoder pulse and the position detection accuracy of the encoder is improved on the basis of the measurement result.

SUMMARY

In the related art method described above, however, it is difficult to realize high resolution with high precision since high resolution is realized on the basis of the clock number between past encoder pulses. Particularly when a speed change occurs, it is not possible to acquire the correct position detection information.

In order to solve the above-described problems, according to an aspect of the invention, there is provided an encoder signal processor which processes a pulsed encoder signal output from an encoder in accordance with a travel distance of an object to be detected, comprising: an increasing and decreasing wave generating unit that generates an increasing and decreasing wave, which increases when the encoder signal is at one of a high level and a low level and decreases when the encoder signal is at the other level, based on the encoder signal output from the encoder; an intermediate pulse signal generating unit that generates a binarized intermediate pulse signal, of which logic is inverted for every predetermined timing in an increasing period and every predetermined timing in a decreasing period of the increasing and decreasing wave, based on the increasing and decreasing wave generated by the increasing and decreasing wave generating unit; and a multiplied pulse signal generating unit that generates a multiplied pulse signal, which is a signal obtained by multiplying the encoder signal by 2, by performing exclusive-OR operation between the encoder signal output from the encoder and the intermediate pulse signal generated by the intermediate pulse signal generating unit.

In the encoder signal processor configured as described above, the increasing and decreasing wave is generated from the encoder signal (pulse signal), and the intermediate pulse signal is generated from the increasing and decreasing wave. Since the intermediate pulse signal is a pulse signal of which the logic is inverted at a predetermined timing in an increasing period and a decreasing period of the increasing and decreasing wave, the phase of the intermediate pulse signal is shifted from that of the encoder signal.

Therefore, the multiplied pulse signal which is a signal obtained by multiplying the encoder signal by 2 can be generated by performing exclusive-OR operation between the encoder signal and the intermediate pulse signal of which the phase is shifted from that of the encoder signal as described above.

Therefore, in the encoder signal processor according to the aspect of the invention, a multiplied pulse signal (a signal obtained by multiplying an encoder signal by 2) can be generated without reducing the slit width or distance between the slits in the encoder or without increasing the number of light receiving elements. As a result, the resolution of the encoder can be improved more than the original physical resolution of the encoder with high precision while suppressing an increase in the size of the apparatus configuration or a cost increase.

In addition, realizing high resolution is not based on past information (for example, a pulse interval) unlike the related art, and a multiplied pulse signal is generated in real time from an encoder signal which is currently output. Accordingly, even if a speed change occurs in the object to be detected, a multiplied pulse signal with high precision in which the speed change is considered can be generated.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

Hereinafter, exemplary embodiments of the invention will be described with reference to the accompanying drawings.

First Embodiment (1) Configuration of an Ink Jet Printer

Figure 1:
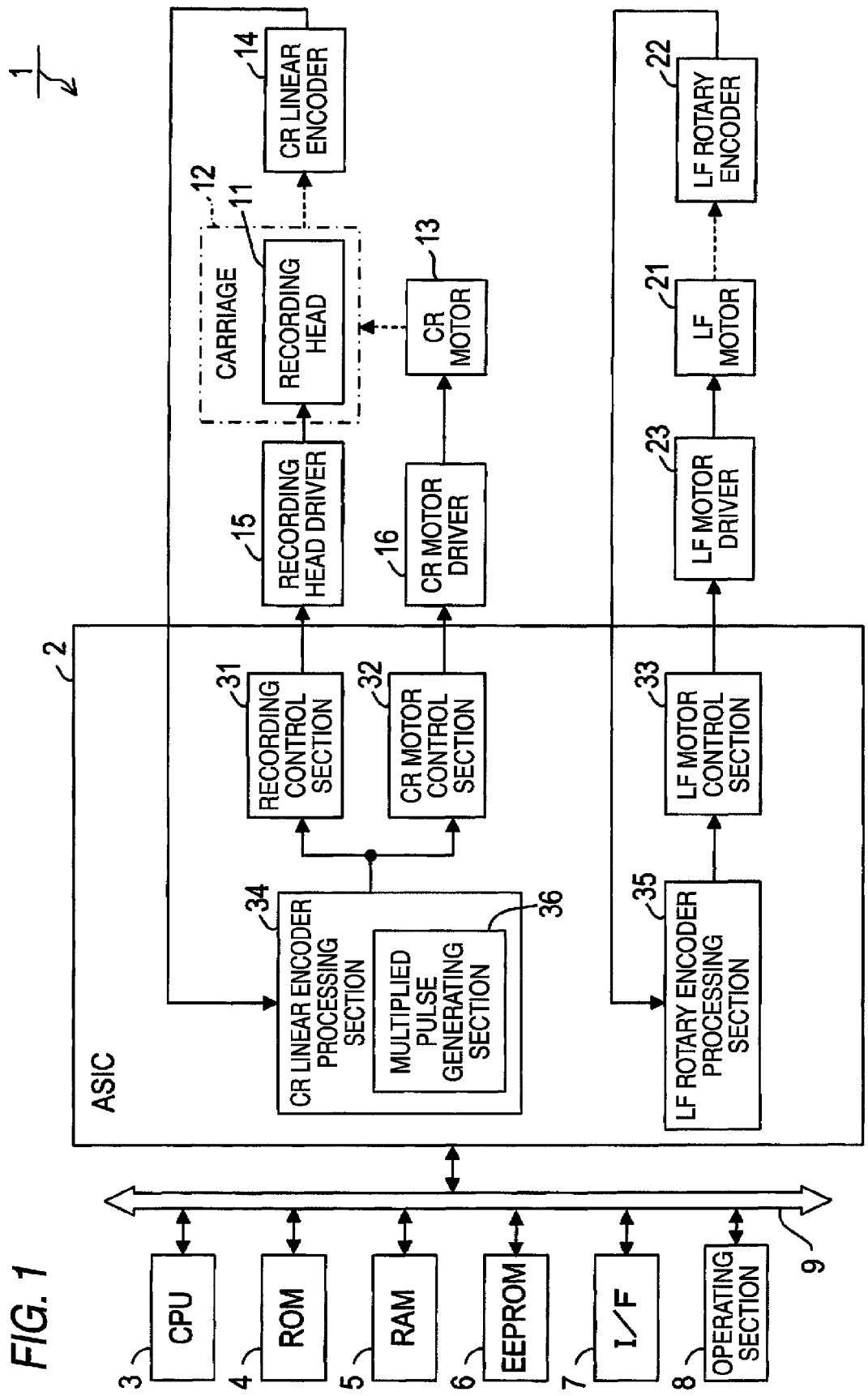
FIG. 1 is a block diagram showing the electric configuration of an ink jet printer of an embodiment.

The ink jet printer 1 of the present embodiment forms an image on paper P (not shown in FIG. 1; see FIG. 2) set in a paper tray while separating and transporting the paper P one by one. As shown in FIG. 1, the ink jet printer 1 includes: a recording head 11 in which a plurality of nozzles for discharging ink droplets onto the paper P is arrayed; a carriage 12 mounted with the recording head 11; a carriage (CR) motor 13 which is a driving source for making the carriage 12 reciprocate in a main scanning direction (direction perpendicular to a sub-scanning direction in which the paper P is transported) when an image is formed on the paper P by the recording head 11; a CR linear encoder 14 for detecting the travel distance (position or speed) of the carriage 12; a line feed (LF) motor 21 which is a driving source of a transport roller (not shown) which transports the paper P in the sub-scanning direction; and an LF rotary encoder 22 for detecting the rotation amount of the LF motor 21 (eventually, the transport amount of the paper P).

In addition, both the CR motor 13 and the LF motor 21 are DC motors in the present embodiment. In addition, both the CR linear encoder 14 and the LF rotary encoder 22 are incremental optical encoders in the present embodiment.

In addition, the ink jet printer 1 further includes: a recording head driver 15 for discharging ink droplets by driving the recording head 11; a CR motor driver 16 for driving the CR motor 13; an LF motor driver 23 for driving the LF motor 21; and an ASIC 2 which controls operations of the drivers 15, 16, and 23 by outputting a driving command to each of the drivers 15, 16, and 23.

Here, the specific configuration of an image forming mechanism of the ink jet printer 1 which is formed by the carriage 12, the CR motor 13 and the CR linear encoder 14 will be described with reference to FIG. 2.

Figure 2:
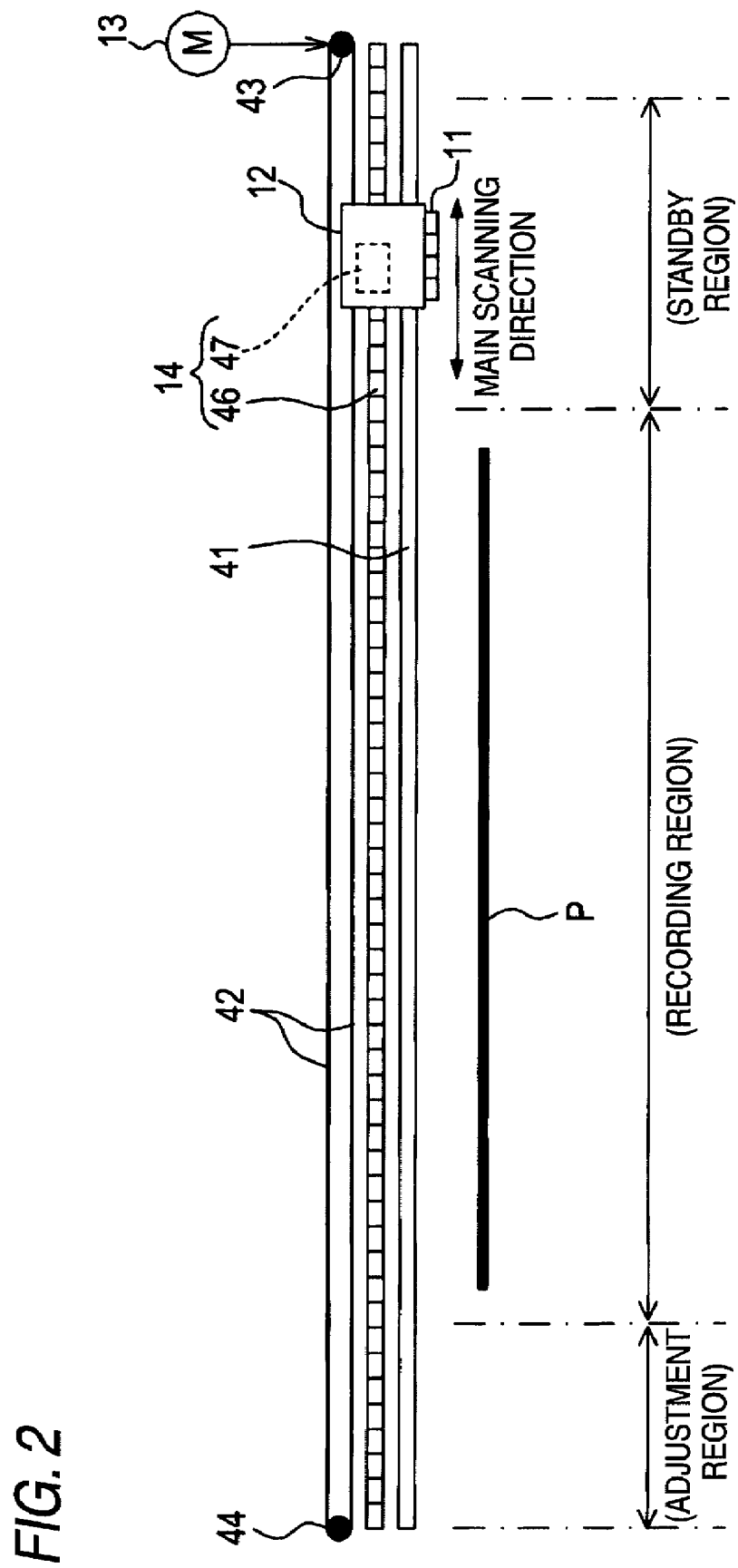
FIG. 2 is an explanatory view showing the schematic configuration of an image forming mechanism in the ink jet printer of the embodiment.

As shown in FIG. 2, in the image forming mechanism in the ink jet printer 1 of the present embodiment, a guide shaft 41 is provided in the width direction (main scanning direction) of the paper P, and the carriage 12 mounted with the recording head 11 is inserted in the guide shaft 41.

The carriage 12 is connected to an endless belt 42 provided in the main scanning direction. The endless belt 42 is stretched between a driving pulley 43 of the CR motor 13, which is provided at one end side in the main scanning direction, and a driven pulley 44, which is provided at the other end side of the guide shaft 41. Accordingly, the carriage 12 is driven to reciprocate in the main scanning direction along the guide shaft 41 by the driving force of the CR motor 13 transmitted through the endless belt 42.

Moreover, near the guide shaft 41, a linear scale 46 with slits which are formed in the main scanning direction with predetermined distances therebetween is provided along the guide shaft 41 (that is, along the moving path of the carriage 12). In addition, a detector 47 in which a light emitting section and a light receiving section (not shown) are disposed with the linear scale 46 interposed therebetween is provided at a position facing the linear scale 46 in the carriage 12. The linear scale 46 and the detector 47 form the CR linear encoder 14.

The detector 47 outputs two kinds of pulse signals (A phase signal and B phase signal), which have a phase difference (90° in the present embodiment), according to the movement of the carriage 12. Moreover, when the movement direction of the carriage 12 is a left direction in the drawing (direction from a side of the driving pulley 43 to a side of the driven pulley 44; hereinafter, referred to as a 'forward direction'), the A phase signal of the pulse signals with A and B phases leads the B phase signal in phase. On the contrary, when the movement direction of the carriage 12 is a right direction in the drawing (direction from the side of the driven pulley 44 to the side of the driving pulley 43; hereinafter, referred to as a 'reverse direction'), the A phase signal lags behind the B phase signal in phase.

The pulse signals with A and B phases are input to a CR linear encoder processing section 34 in the ASIC 2.

The CR linear encoder processing section 34 detects the position or speed, movement direction (hereinafter, collectively referred to as a 'driving state') of the carriage 12 on the basis of the pulse signals with A and B phases input from the CR linear encoder 14. Then, the detection result is output to a recording control section 31 and a CR motor control section 32.

In addition, the CR linear encoder processing section 34 detects the position or the speed on the basis of the A phase signal of the pulse signals with A and B phases. However, the CR linear encoder processing section 34 of the present embodiment does not detect the position or the speed using the A phase signal as it is, but multiplies the A phase signal by 2 using a multiplied pulse generating section 36. In addition, the CR linear encoder processing section 34 detects the position or the speed on the basis of the multiplied pulse signal which has been multiplied by 2.

That is, the A phase signal is equivalent to an encoder signal of the invention. Therefore, in the following description, the A phase signal (that is, a pulse signal multiplied by 2) from the CR linear encoder 14 is also called an 'encoder signal'. In addition, the specific configuration of the multiplied pulse generating section 36 will be described in detail later.

The recording control section 31 generates a driving command for driving the recording head 11 on the basis of the driving state (position, speed, movement direction) of the carriage 12 detected by the CR linear encoder processing section 34 and outputs the driving command to the recording head driver 15. The recording head driver 15 discharges ink droplets by applying a driving voltage to the recording head 11 according to the driving command input from the recording control section 31.

The CR motor control section 32 generates the control input for controlling the CR motor 13 on the basis of the driving state of the carriage 12 detected by the CR linear encoder processing section 34. In addition, a driving command (PWM signal or the like) corresponding to the generated control input is output to the CR motor driver 16. That is, the CR motor control section 32 performs feedback control of the carriage 12 on the basis of the actual driving state of the carriage 12.

The CR motor driver 16 is formed by using an H bridge circuit or the like for rotating the CR motor 13 by supplying electric power to the CR motor 13. The CR motor driver 16 supplies electric power to the CR motor 13 according to the driving command input from the CR motor control section 32 and rotates the CR motor 13.

On the other hand, the LF rotary encoder 22 has an encoder wheel (not shown) in which slits are formed along the periphery with predetermined distances therebetween and which rotates together with the rotation of the LF motor 21. The LF rotary encoder 22 outputs two pulse signals (A phase signal and B phase signal) of which the phases are shifted from each other according to the rotation of the LF motor 21 (that is, according to the transport of the paper P). These pulse signals are input to an LF rotary encoder processing section 35 in the ASIC 2.

The LF rotary encoder processing section 35 detects the position, speed, or the like of the paper P on the basis of the pulse signals with A and B phases input from the LF rotary encoder 22. Then, the detection result is output to an LF motor control section 33.

The LF motor control section 33 generates the control input for controlling the LF motor 21 on the basis of the position, speed, or the like of the paper P detected by the LF rotary encoder processing section 35. In addition, a driving command (PWM signal or the like) corresponding to the generated control input is output to the LF motor driver 23.

The LF motor driver 23 is formed by using an H bridge circuit or the like for rotating the LF motor 21 by supplying electric power to the LF motor 21. The LF motor driver 23 supplies electric power to the LF motor 21 according to the driving command input from the LF motor control section 33 and rotates the LF motor 21.

In addition, the ink jet printer 1 includes: a CPU 3 which performs overall control of each section of the ink jet printer 1 including the ASIC 2; a ROM 4 in which a program executed by the CPU 3 is stored; a RAM 5 which is used as a work area when a program is executed by the CPU 3; an EEPROM 6 in which various kinds of setup information are stored; an interface (I/F) 7 which is connected to a personal computer (PC; not shown) and which receives various kinds of data, such as an image forming command or image data, transmitted from the PC or transmits various kinds of data, such as an operating state of the ink jet printer 1, to the PC; and an operating section 8 including various operation buttons and a display device (not shown). These components and the ASIC 2 are connected to each other through a bus 9.

In the ink jet printer 1 configured as described above, when forming an image on the paper P using the recording head 11, the carriage 12 which has stopped in the standby region (see FIG. 2) starts to accelerate toward the recording region (that is, in the forward direction) and reaches a predetermined fixed target speed soon. Moreover, in the present embodiment, the carriage 12 moves at the fixed target speed at least in the recording region.

In addition, while the carriage 12 is moving at the fixed target speed in the recording region, ink droplets are discharged from the recording head 11 onto the paper P so that an image of one line is formed on the paper P. Then, the carriage 12 slows down and stops within an adjustment region. After the stop, the carriage 12 starts to move again in a direction (that is, reverse direction) from the adjustment region to the standby region so that an image of one line is formed in the recording region. Then, the carriage 12 slows down and stops within the standby region.

Thus, since the carriage 12 reciprocates in the main scanning direction and an image of one line is formed by the recording head 11 whenever the carriage 12 reciprocates in the main scanning direction, an image of one page is formed on the paper P eventually.

(2) Configuration of a Multiplied Pulse Generating Section

Next, the configuration of a multiplied pulse generating section 36, which is provided in the CR linear encoder processing section 34 within the ASIC 2, in the ink jet printer 1 of the present embodiment will be described with reference to FIG. 3.

The multiplied pulse generating section 36 generates a multiplied pulse signal obtained by multiplying an encoder signal (A phase signal), which is input from the CR linear encoder 14, by 2 as described above. As shown in FIG. 3, the multiplied pulse generating section 36 includes: an offset circuit 51 which offsets the encoder signal such that the central value of the amplitude becomes 0V; an integrating circuit 52 which generates a triangular-wave integrated signal by integrating with the signal (offset signal) offset by the offset circuit 51; a low band removing filter 53 which removes a DC component from the integrated signal generated by the integrating circuit 52; an intermediate pulse signal generating circuit 54 which generates an intermediate pulse signal, of which a signal level (logic) is inverted for every zero cross timing (timing at which the value of a low band removed signal becomes 0), on the basis of the integrated signal (low band removed signal) from which a DC component has been removed by the low band removing filter 53; an XOR gate 55 which outputs a multiplied pulse signal, which is a signal obtained by multiplying the encoder signal by 2, by performing exclusive-OR operation between the intermediate pulse signal generated by the intermediate pulse signal generating circuit 54 and the encoder signal; and a selection switch 56 which selects and outputs one of the multiplied pulse signal and the encoder signal.

Hereinafter, the above-described circuits which form the multiplied pulse generating section 36 will be described more specifically with reference to FIG. 4.

Figure 4:
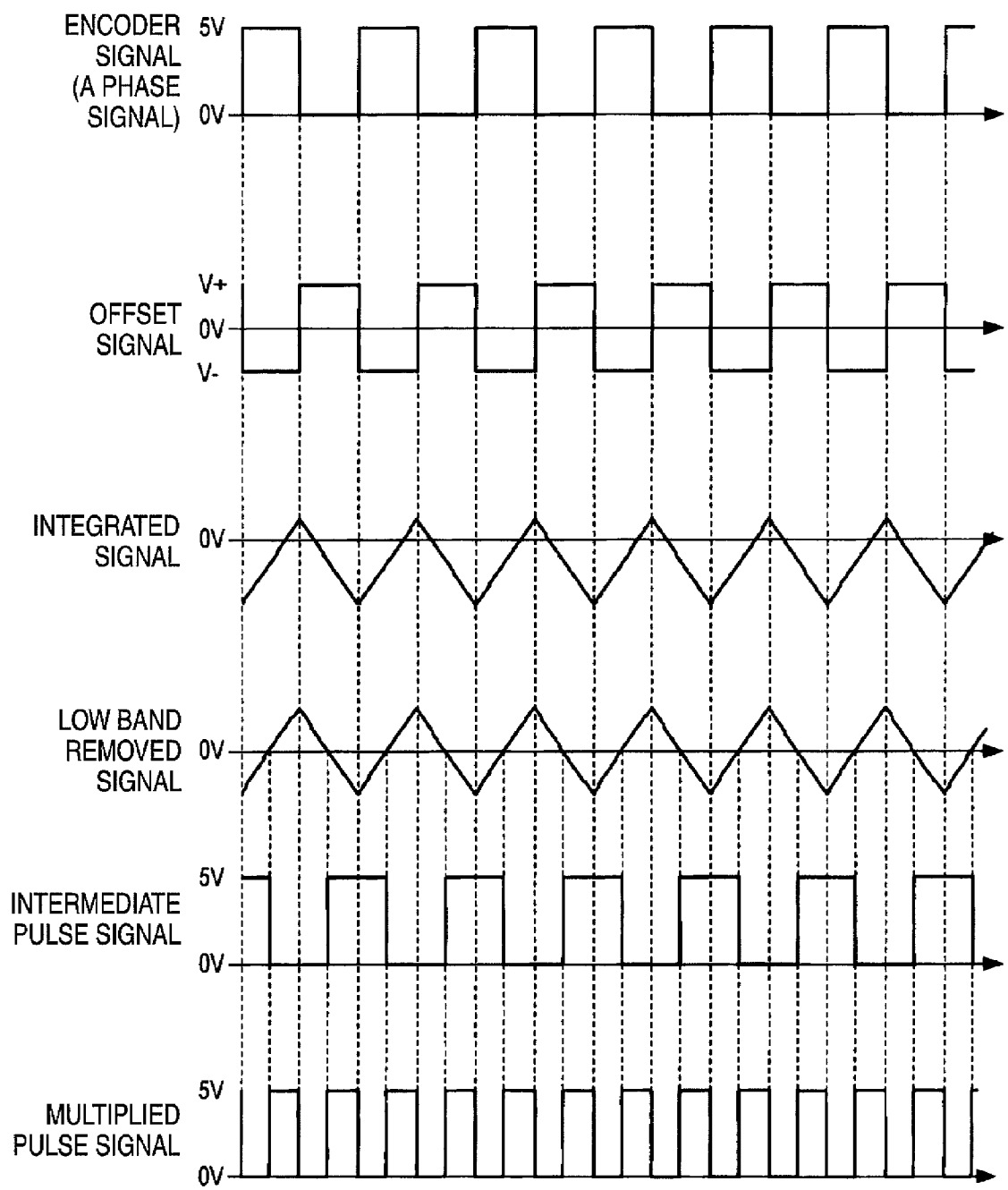
FIG. 4 is a timing chart showing an operating state of the multiplied pulse generating section when a carriage is driven at the fixed speed.

As shown in FIG. 4, in the present embodiment, a pulse signal which is 0V at the low level and 5V at the high level is input as an encoder signal (A phase signal) from the CR linear encoder 14.

The offset circuit 51 includes a comparator 61 to which positive (V+) and negative (V−) power is supplied, and the encoder signal is input to an inverting input terminal of the comparator 61 through a resistor R1. In addition, V+ and V− mean voltages with the same absolute value and opposite signs (positive and negative). A non-inverting input terminal of the comparator 61 is connected to a voltage source which supplies a predetermined comparison voltage Vr through a resistor R2. In the present embodiment, the comparison voltage Vr is 2.5V as an example.

In the offset circuit 51 configured as described above, a signal corresponding to the comparison result of the comparison voltage Vr and the encoder signal input to the inverting input terminal is generated. That is, when the encoder signal is smaller than the comparison voltage Vr, an output of the comparator 61 is set to the high level (V+). On the other hand, when the encoder signal is equal to or larger than the comparison voltage Vr, the output of the comparator 61 is set to the low level (V−).

Accordingly, as shown in FIG. 4, an offset signal which is set to the low level (V−) when the encoder signal is at a high level (5V) and is set to the high level (V+) when the encoder signal is at a low level (0V) is output from the offset circuit 51. That is, the offset signal is a signal in which the middle value of the amplitude is 0V. For example, assuming that V+ is 2.5V and V− is −2.5V, the offset signal is a signal obtained by offsetting an encoder signal with an amplitude of 5V without changing the amplitude.

The integrating circuit 52 is an integrating circuit configured as an active circuit using an operational amplifier, although not shown in the present embodiment. In addition, the integrating circuit 52 of the present embodiment is an inverted circuit that outputs a signal, which decreases when an input signal is at a high level, and outputs a signal, which increases when the input signal is at a low level.

Accordingly, as shown in FIG. 4, a triangular-wave integrated signal which increases when the input offset signal is at the low level (V−) and decreases when the input offset signal is at the high level (V+) is output. In addition, since the integrating circuit 52 of the present embodiment is configured as an active circuit as described above, a triangular-wave integrated signal with high linearity is generated as shown in FIG. 4.

The low band removing filter 53 is provided in order to remove a DC component from the integrated signal output from the integrating circuit 52. The integrated signal output from the integrating circuit 52 does not necessarily become a triangular wave, which increases and decreases with 0V as the center, due to various factors, such as a state of the offset signal from the offset circuit 51 or integration start timing of the integrating circuit 52.

Therefore, by making the integrated signal pass through the low band removing filter 53, a low band removed signal from which a DC component of the integrated signal is removed, that is, a triangular wave signal which increases and decreases with 0V as the center is obtained.

The intermediate pulse signal generating circuit 54 includes a comparator 62 which operates by single power with the voltage V+ (for example, 5V), and the low band removed signal from the low band removing filter 53 is input to an inverting input terminal of the comparator 62 through a resistor R3. A non-inverting input terminal of the comparator 62 is connected to the ground potential (0V) through a resistor R4.

In the intermediate pulse signal generating circuit 54 configured as described above, a signal corresponding to the comparison result of the ground potential and the low band removed signal input to the inverting input terminal is generated. That is, when the low band removed signal is smaller than 0V, an output of the comparator 62 is set to a high level. On the other hand, when the low band removed signal is equal to or larger than 0V, the output of the comparator 62 is set to a low level.

Accordingly, from the intermediate pulse signal generating circuit 54, an intermediate pulse signal of which the logic is inverted for every zero cross timing at which a low band removed signal becomes 0V is generated, as shown in FIG. 4. That is, the intermediate pulse signal generating circuit 54 performs a binarization operation on the low band removed signal at the zero cross timing so that an intermediate pulse signal of which the phase is shifted by 90° from that of the encoder signal is generated as a result.

The XOR gate 55 is a gate circuit which performs an exclusive-OR operation between two input signals. The encoder signal and the intermediate pulse signal are input to the XOR gate 55, and an exclusive-OR operation between the two signals is performed. Here, the intermediate pulse signal is a signal of which the phase is shifted by 90° from that of the encoder signal.

Accordingly, as shown in FIG. 4, a multiplied pulse signal obtained by multiplying the encoder signal by 2 is output from the XOR gate 55. In this way, in the multiplied pulse generating section 36, the multiplied pulse signal obtained by multiplying the encoder signal by 2 is generated. However, the generation of the multiplied pulse signal is not limited to the case where the carriage 12 is driven at the fixed speed as shown in FIG. 4. For example, even if the carriage 12 is driven to decelerate or a speed change occurs in the carriage 12, the multiplied pulse signal is normally generated.

Figure 5:
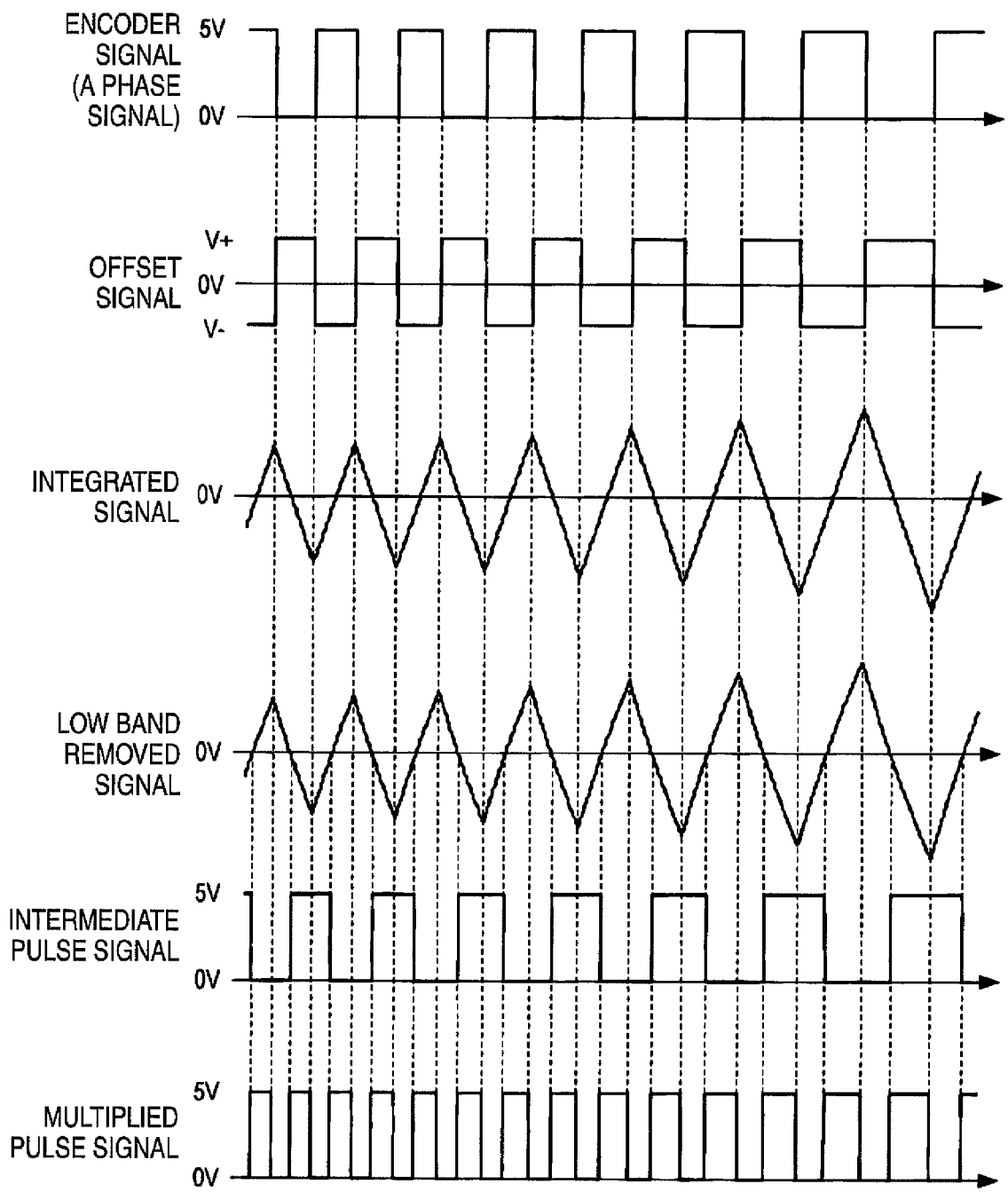
FIG. 5 is a timing chart showing an operating state of the multiplied pulse generating section when a carriage is driven to decelerate.

While the carriage 12 is being driven to decelerate, the period of an encoder signal increases as shown in FIG. 5. Here, according to the period increase, both a low level period and a high level period in the encoder signal increase similarly. Accordingly, the central value of the amplitude of an integrated signal does not fluctuate much. In addition, since the integrated signal passes through the low band removing filter 53, a stable low band removed signal is generated. As a result, a stable intermediate pulse signal is generated and a stable multiplied pulse signal is generated.

Figure 6:
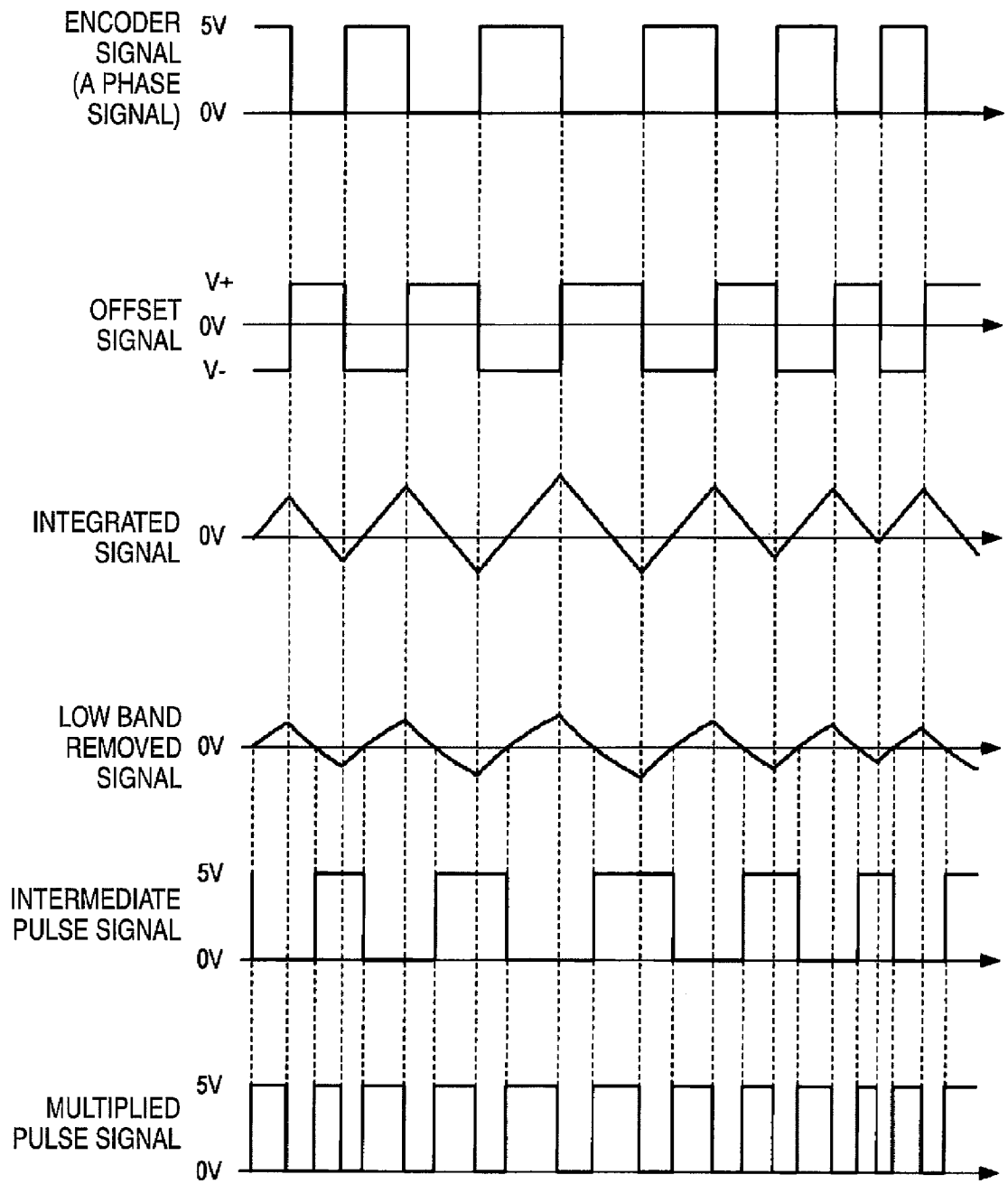
FIG. 6 is a timing chart showing an operating state of the multiplied pulse generating section when a speed change occurs in a carriage.

When a speed change occurs in the carriage 12, the period of an encoder signal changes irregularly as shown in FIG. 6. Accordingly, a low level period and a high level period of the encoder signal also change irregularly. Therefore, in an integrated signal from the integrating circuit 52, a period also occurs for which the integrated signal is in an unstable state of deviating to the positive or negative side with respect to 0V.

However, by removing a DC component included in the integrated signal with the low band removing filter 53, a stable low band removed signal which increases and decreases with 0V as the center is acquired as shown in FIG. 6. As a result, a stable intermediate pulse signal is generated and a stable multiplied pulse signal is generated.

In addition, the selection switch 56 for selecting a signal, which is finally output from the multiplied pulse generating section 36, is provided in the multiplied pulse generating section 36. Accordingly, either the encoder signal or the multiplied pulse signal which is selected by the selection switch 56 is output from the multiplied pulse generating section 36.

As described above, in the CR linear encoder processing section 34, detection of the position or speed of the carriage 12 is basically performed on the basis of the multiplied pulse signal generated by the multiplied pulse generating section 36.

However, depending on the relationship between the driving start timing of the carriage 12 and the integration start timing of the integrating circuit 52, there is a possibility that integration of the integrating circuit 52 has already progressed at the start of driving of the carriage and accordingly, the integrated signal will deviate largely from 0V. In addition, even if the integration of the integrating circuit 52 is made to start in synchronization with the start of driving of the carriage 12, the integrated signal may also deviate to the positive or negative side from 0V depending on the position at the start of driving of the carriage 12.

That is, since the integrated signal may be in the unstable state of deviating largely from 0V immediately after the start of driving of the carriage 12, there is a possibility that a multiplied pulse signal will not be generated normally from such an unstable integrated signal.

Figure 7:
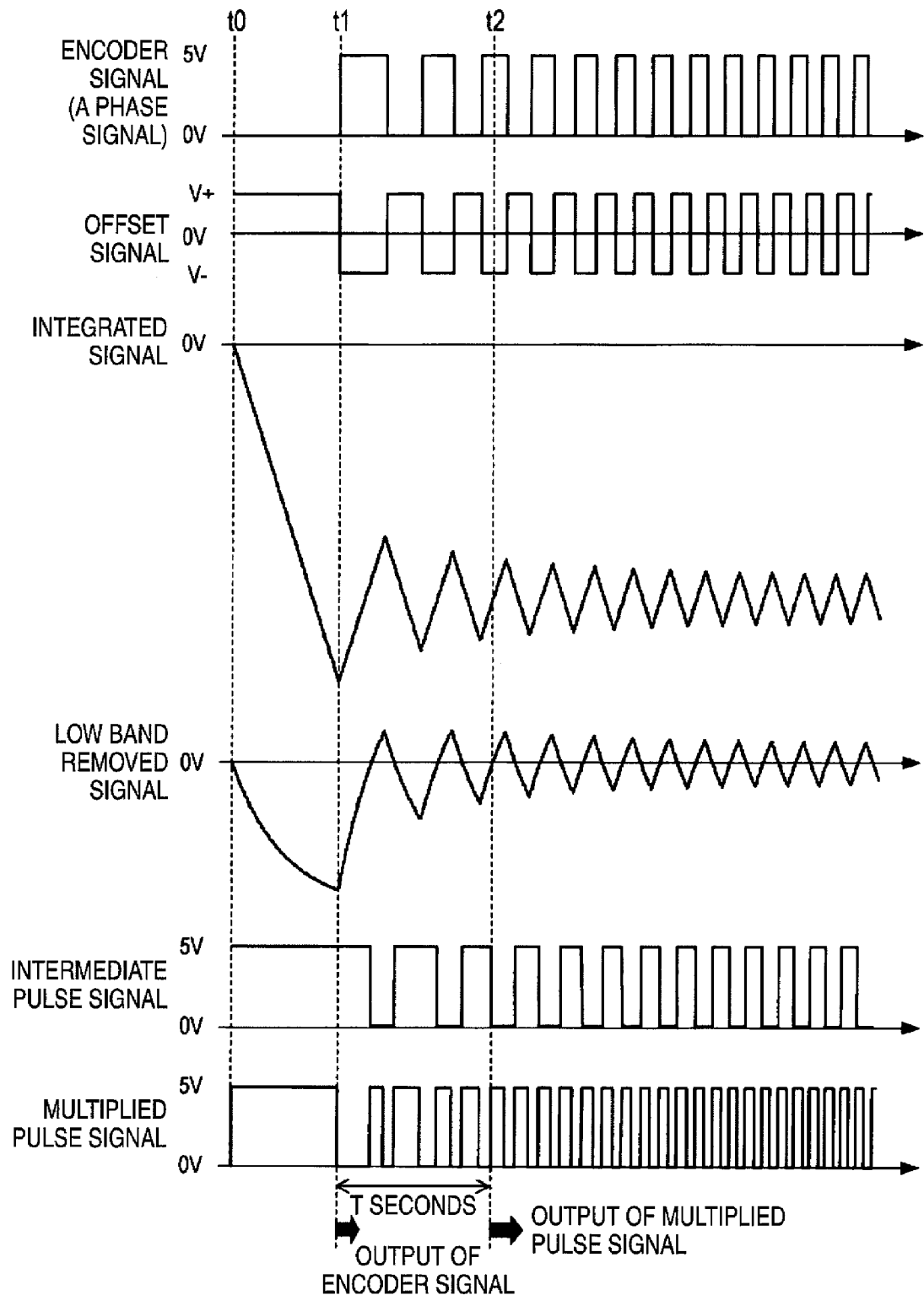
FIG. 7 is a timing chart showing an operating state of the multiplied pulse generating section at the start of driving of the carriage.

FIG. 7 illustrates the situation specifically. In the example shown in FIG. 7, an integrated signal continuously decreases from 0V because the level of an offset signal is not changed (high level in FIG. 7) during a period from time t0, at which power is supplied to the ink jet printer 1, to time t1 at which driving of a carriage is actually started.

Accordingly, even if the integrated signal passes through the low band removing filter 53, the signal level of a low band removed signal is not stabilized immediately after the carriage driving is started at time t1, but it takes a time until it becomes a stable low band removed signal (triangular wave) which increases and decreases with 0V as the center.

Therefore, when driving of the carriage 12 has started, the CR linear encoder processing section 34 detects the driving state of the carriage 12 using an encoder signal without using a multiplied pulse, which is generated by the multiplied pulse generating section 36, until the amplitude center of a low band removed signal drops to 0V. Therefore, when the driving of the carriage 12 is started, the selection switch 56 is switched to the encoder signal side so that an encoder signal is output from the multiplied pulse generating section 36.

Then, the CR linear encoder processing section 34 switches the selection switch 56 to the XOR gate 55 side when T seconds has passed after the start of driving of the carriage 12 and a low band removed signal is almost stabilized to increase and decrease with 0V as the center (time t2). Then, a multiplied pulse signal is output from the multiplied pulse generating section 36, and the driving state of the carriage 12 is detected on the basis of the multiplied pulse signal.

Accordingly, after time t2, it becomes equivalent to detecting the driving state of the carriage 12 on the basis of an encoder signal from a linear encoder with physical resolution, which is twice the resolution of the CR linear encoder 14. As a result, the driving of the carriage 12 is controlled with high precision.

(3) Explanation of Carriage Driving Processing

Figure 8:
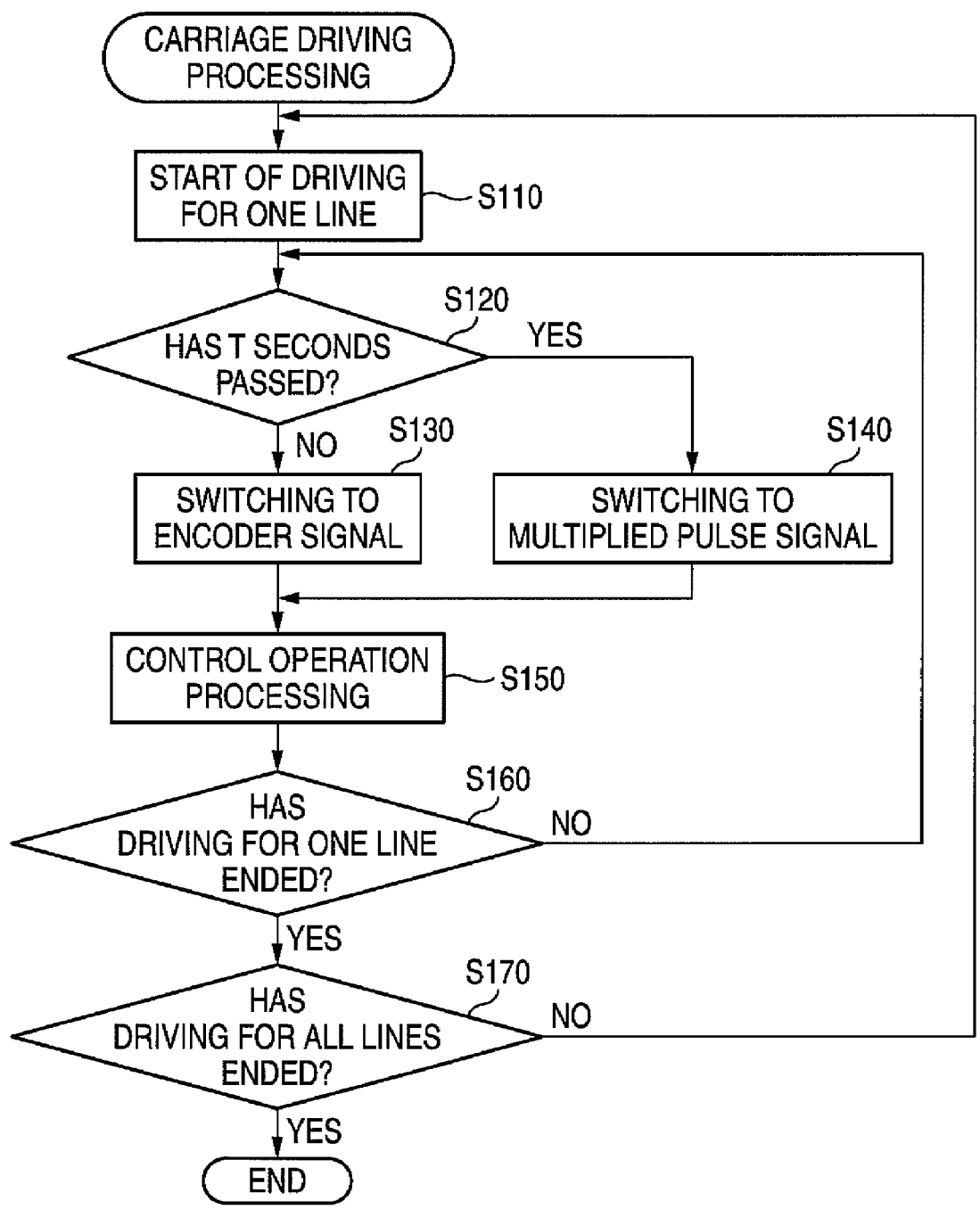
FIG. 8 is a flow chart showing carriage driving processing performed in an ASIC.

Next, carriage driving processing which is performed in the ASIC 2 in order to control the driving of the carriage 12 will be described with reference to FIG. 8. This carriage driving processing is performed in response to a command from the CPU 3 when forming an image on the paper P, for example, when there is an instruction of image formation from an external PC or there is an instruction of image formation by an operation of the operating section 8.

If the carriage driving processing is started, driving of the carriage 12 for one line is first started in S110. This driving start timing corresponds to the time t1 in the timing chart shown in FIG. 7.

Then, in step S120, it is determined whether or not T seconds has passed from the start of driving. If T seconds has not passed yet (S120: NO), the selection switch 56 is switched to the encoder signal side. Accordingly, from the multiplied pulse generating section 36, an encoder signal (A phase signal) input from the CR linear encoder 14 is output as it is.

As a result, in subsequent step S150, various kinds of control operation processing are performed on the basis of the encoder signal output from the multiplied pulse generating section 36, and the carriage 12 is driven. Then, in step S160, it is determined whether or not driving for one line has ended. If the driving for one line has not ended yet (S160: NO), the process returns to step S120 to determine again whether or not T seconds has passed from the start of driving. Accordingly, in the CR motor control section 32, not based on a multiplied pulse signal but based on the original encoder signal, various kinds of control operations are performed until T seconds passes from the start of driving.

On the other hand, if T seconds has passed from the start of driving of the carriage 12 (S120: YES), the process proceeds to step S140 in which the selection switch 56 is switched to the multiplied pulse signal side. Accordingly, a multiplied pulse signal is output from the multiplied pulse generating section 36. In addition, the timing at which T seconds has passed from the start of driving corresponds to the time t2 in the timing chart shown in FIG. 7.

Subsequently, until one line driving ends, various kinds of control processing are performed on the basis of the multiplied pulse signal. Then, if the driving of the carriage 12 for one line ends (S160: YES), the process proceeds to step S170 in which it is determined whether or not driving of all lines has ended, that is, whether or not driving of one page of the paper P has ended. Then, if driving of all lines has not ended yet (S170: NO), the process returns to step S110. If driving of all lines has ended (S170: YES), this carriage driving processing ends.

(4) Advantages of the First Embodiment

In the ink jet printer 1 of the present embodiment described above, the multiplied pulse generating section 36 generates a multiplied pulse signal on the basis of the encoder signal (A phase signal) from the CR linear encoder 14. In addition, the generation of the multiplied pulse signal is performed without reducing the slit width or distance between slits in the linear scale 46 or without increasing the number of light receiving sections in the detector 47.

Therefore, the resolution of the CR linear encoder 14 can be improved more than the original physical resolution of the CR linear encoder 14 with high precision while suppressing an increase in the size of the apparatus configuration or a cost increase.

In addition, realizing the high resolution is not based on the past information (for example, a pulse interval) unlike the related art, and a multiplied pulse signal is generated in real time from an encoder signal which is currently output. Accordingly, even if a speed change occurs in the carriage 12, a multiplied pulse signal with high precision in which the speed change is considered can be generated.

In addition, in the multiplied pulse generating section 36, the offset circuit 51 offsets an encoder signal before the encoder signal is input to the integrating circuit 52, so that the encoder signal is converted into an offset signal which increases and decreases with 0V as the center. In addition, the offset signal is input to the integrating circuit 52.

Accordingly, in the integrating circuit 52, an integrated signal (triangular wave) which increases or decreases with 0V (or the neighborhood) as the center is generated unless a speed change is large. As a result, a stable intermediate pulse signal can be easily generated in the intermediate pulse signal generating circuit 54.

Particularly in the present embodiment, the integrating circuit 52 is configured as an active circuit. Accordingly, a triangular-wave integrated signal with high linearity is generated. That is, an integrated signal which increases and decreases with 0V as the center and has high linearity is generated. Therefore, the intermediate pulse signal generating circuit 54 can generate an intermediate pulse signal, the phase of which is shifted by 90° from that of an encoder signal, easily and precisely. As a result, it is possible to further improve the precision of a multiplied pulse signal which is finally generated.

In addition, in the present embodiment, the intermediate pulse signal is generated after removing a DC component by making the integrated signal pass through the low band removing filter 53. Accordingly, a signal in which the amplitude center of an integrated signal is closer (or equal) to 0V can be generated as a low band removed signal regardless of the start timing of generation of an integrated signal using the integrating circuit 52, the speed change of the carriage 12, or the like. As a result, an intermediate pulse signal can be generated more precisely and reliably. Thus, the precision of a multiplied pulse signal can be further improved.

Moreover, in the ink jet printer 1, driving control (feedback control) of the carriage 12 is performed on the basis of the multiplied pulse signal generated as described above. Therefore, the control performance of the carriage 12 can be improved while suppressing an increase in the size of the apparatus configuration or a cost increase.

In addition, during the driving period of the carriage 12, the multiplied pulse signal is not always used. That is, the encoder signal is used during a predetermined period (for T seconds) from the start of driving, and the multiplied pulse signal is used after the predetermined period (T seconds) has passed from the start of driving. Accordingly, it is possible to prevent an adverse effect caused by using a multiplied pulse signal which may be in an unstable state immediately after the start of driving. As a result, more precise control of the carriage 12 based on the stable multiplied pulse signal becomes possible.

Here, the correspondence relationship between constituent components of the present embodiment and constituent components of the invention will be described only for reference. For example, in the present embodiment, the offset circuit 51 corresponds to an offset unit of the invention, the integrating circuit 52 corresponds to an increasing and decreasing wave generating unit of the invention, the low band removing filter 53 corresponds to a DC component removing unit of the invention, the intermediate pulse signal generating circuit 54 corresponds to an intermediate pulse signal generating unit of the invention, the XOR gate 55 corresponds to a multiplied pulse signal generating unit of the invention, the CR linear encoder processing section 34 corresponds to a transport state detecting unit of the invention, and the CR motor control section 32 corresponds to a control unit of the invention.

Second Embodiment

Next, an example of the configuration of a multiplied pulse generating section which is different from the multiplied pulse generating section 36 in the ink jet printer 1 of the first embodiment will be described as a second embodiment.

Figure 9:
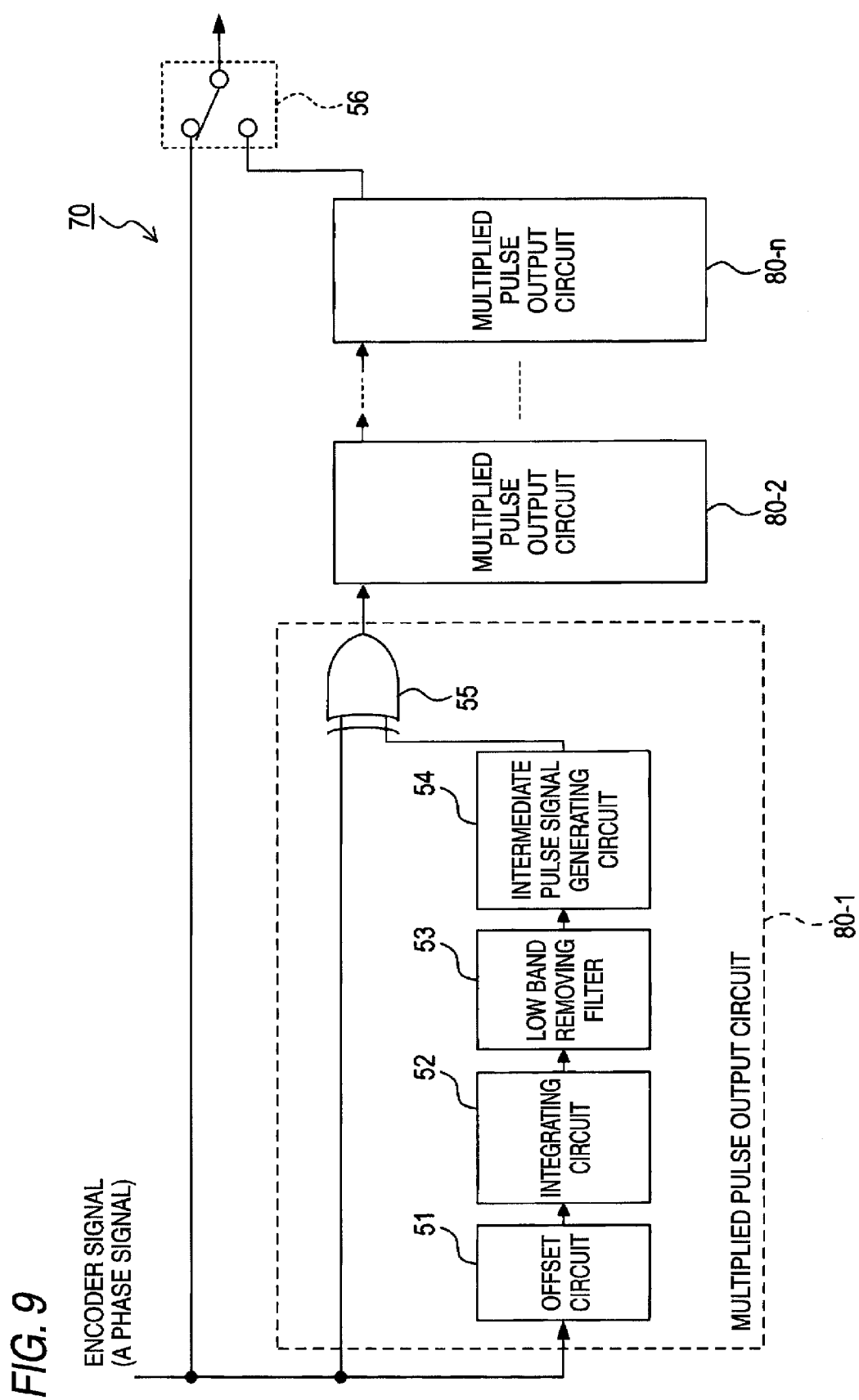
FIG. 9 is an explanatory view showing the schematic configuration of a multiplied pulse generating section of a second embodiment.

FIG. 9 shows the configuration of a multiplied pulse generating section 70 of the present embodiment. In the multiplied pulse generating section 70 of the present embodiment, a plurality of (n; n is a natural number) multiplied pulse output circuits 80-1, 80-2, . . . , and 80-$n$ are connected in multiple stages as shown in FIG. 9.

The multiplied pulse output circuits 80-1, 80-2, . . . , and 80-$n$ have completely the same circuit configuration. Accordingly, in FIG. 9, only an internal circuit of the multiplied pulse output circuit 80-1 at the first stage is shown, and internal circuits of the other multiplied pulse output circuit 80-2, . . . , and 80-$n$ are omitted.

Figure 3:
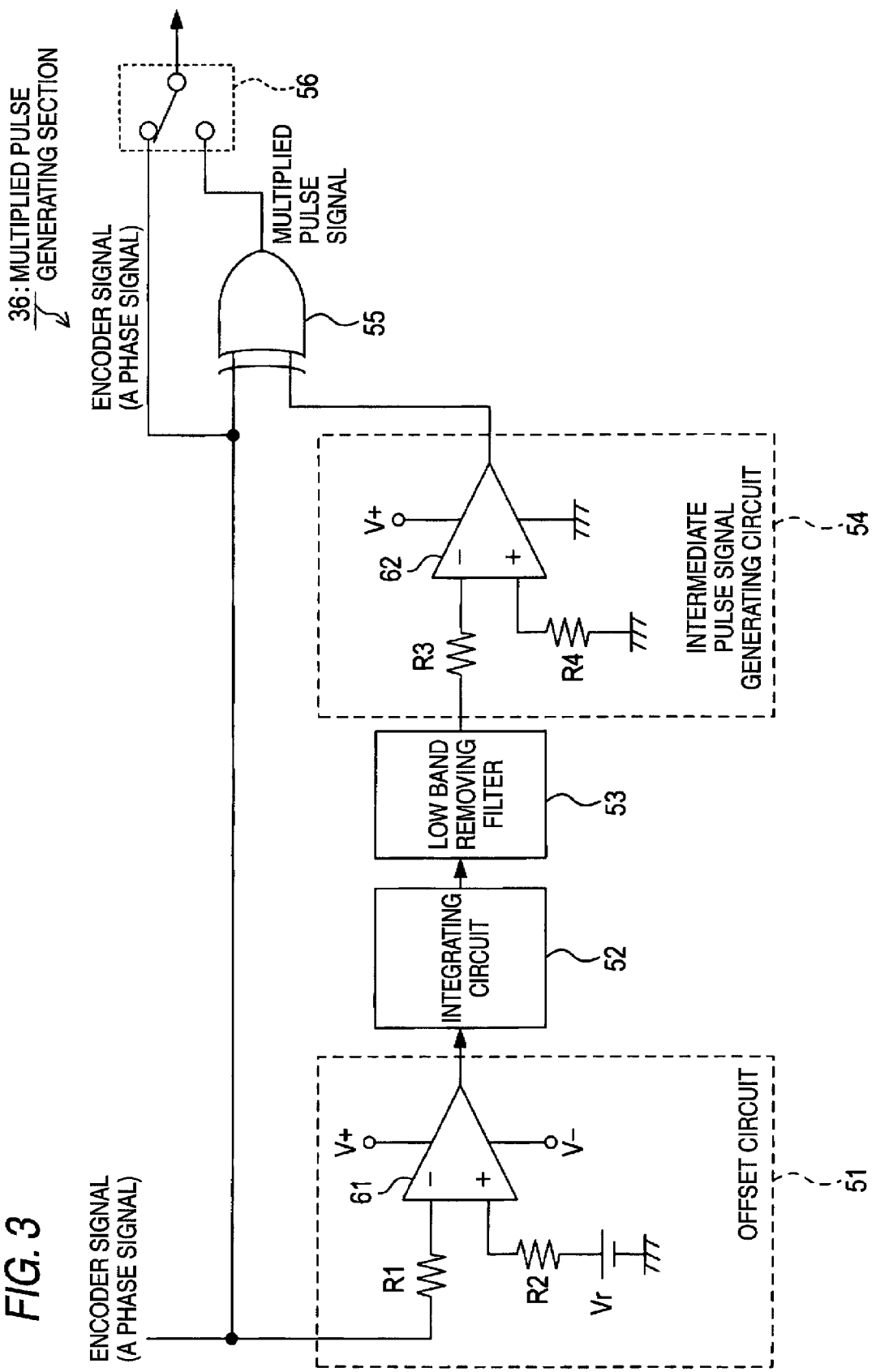
FIG. 3 is an explanatory view showing the schematic configuration of a multiplied pulse generating section of a first embodiment.

Moreover, as is apparent from comparison with the multiplied pulse generating section 36 of the first embodiment shown in FIG. 3, the multiplied pulse output circuit 80-1 has a configuration in which the selection switch 56 is excluded from the multiplied pulse generating section 36 shown in FIG. 3, that is, a configuration including the offset circuit 51, the integrating circuit 52, the low band removing filter 53, the intermediate pulse signal generating circuit 54, and the XOR gate 55 for generating a multiplied pulse signal obtained by multiplying an input signal by 2.

In addition, "n" multiplied pulse output circuits configured as described above are connected in multiple stages, and a multiplied pulse signal from the multiplied pulse output circuit 80-$n$ at the final stage is input to the selection switch 56. By such a configuration, an encoder signal input to the multiplied pulse generating section 70 is first multiplied by 2 in the multiplied pulse output circuit 80-1 at the first stage. Then, the multiplied pulse signal which has been multiplied by 2 is input to the multiplied pulse output circuit 80-2 at the next stage. Here, the multiplied pulse signal is further multiplied by 2. As a result, a multiplied pulse signal obtained by multiplying the original encoder signal by 4 is generated. This multiplied pulse signal is further multiplied by 2 sequentially in each of the multiplied pulse output circuits connected to the latter stage side. As a result, a multiplied pulse signal obtained by multiplying the original encoder signal by $2^n$ is output from the multiplied pulse output circuit 80-$n$ at the final stage.

Thus, according to the multiplied pulse generating section 70 of the present embodiment, the resolution of the CR linear encoder 14 can be further increased and can be increased infinitely theoretically. In addition, the multiplication number of a multiplied pulse can be set to a desired value by appropriately setting the number of multiplied pulse output circuits connected in multiple stages.

In addition, the control performance of the carriage 12 can be further improved by providing the multiplied pulse generating section 70 in the ink jet printer 1 of the first embodiment instead of the multiplied pulse generating section 36 of the first embodiment.

[Modifications]

While the embodiments of the invention have been described, embodiments of the invention are not limited to the above-described embodiments, and various modifications may be made without departing from the technical scope of the invention.

For example, an encoder signal may be input to the integrating circuit 52 as it is without being offset, although an input encoder signal is first offset so as to be converted into an offset signal, which increases and decreases with 0V as the center, and is then input to the integrating circuit 52 in the multiplied pulse generating section 36 in the first embodiment. There are two main reasons, as follows.

First, the integrating circuit 52 is configured to include various circuit elements (operational amplifier, resistor and capacitor). Accordingly, from the circuit configuration, integration in a strict mathematical sense is not performed on an input signal. That is, if an encoder signal changes to a low level (0V), the level of an integrated signal is not maintained, but the value gradually decreases since a voltage (specifically, a value corresponding to the voltage charged in a capacitor which forms the integrating circuit 52) integrated between the low level (0V) and a high level (5V) is discharged. This is well known as input and output characteristics of a normal integrating circuit regardless of whether the integrating circuit 52 is a passive circuit or an active circuit. For this reason, even if an encoder signal the low level of which is 0V is input to the integrating circuit 52 as it is, a triangular-wave integrated signal can be acquired.

In addition, from the integrated signal acquired by the integrating circuit 52, a DC component is removed by the low band removing filter 53. Accordingly, although the amplitude center of the integrated signal is shifted from 0V due to integrating the encoder signal without offsetting the encoder signal, a DC component is removed by making the integrated signal pass through the low band removing filter 53, such that the amplitude center can be set to 0V.

From such a reason, even if an encoder signal is not offset in the offset circuit 51, a low band removed signal which increases and decreases with 0V as the center can be generated and accordingly, the multiplied pulse signal can be generated.

Here, if an encoder signal is offset beforehand in the offset circuit 51 like the first embodiment, an integrated signal itself before being input to the low band removing filter 53 can be generated as a stable triangular wave which increases and decreases with 0V (or the neighborhood) as the center. In addition, by making the stable integrated signal pass through the low band removing filter 53, an intermediate pulse signal (phase difference between the intermediate pulse signal and the encoder signal is closer to 90°) with higher precision can be generated in the intermediate pulse signal generating circuit 54. As a result, a multiplied pulse signal with higher precision can be generated.

In addition, although an integrating circuit configured as an active circuit having active elements, such as an operational amplifier, has been used as the integrating circuit 52 in the above embodiments, forming the integrating circuit 52 with the active circuit as described above is just an example. Depending on the specification (precision) demanded, it is also possible to use a very simple integrating circuit which is a passive circuit formed by a resistor and a capacitor, for example.

In addition, the integrating circuit 52 is not necessarily used as a circuit for generating a triangular wave from an encoder signal (pulse signal), and all kinds of circuits capable of converting a pulse signal into a triangular wave may be used as the circuit for generating a triangular wave.

Moreover, in the embodiment described above, the low band removing filter 53 is provided in order to remove a DC component included in an integrated signal. However, if a signal which increases and decreases with 0V (or the neighborhood) as the center can be generated as an integrated signal, the low band removing filter 53 does not necessarily need to be provided.

In addition, in the embodiment described above, a multiplied pulse signal is generated from the A phase signal of the pulse signals with A and B phases input from the CR linear encoder 14. However, the multiplied pulse signal may be generated from the B phase signal. In addition, both the A and B phase signals may be generated as multiplied pulse signals and driving of the carriage 12 may be controlled using the two multiplied pulse signals.

Moreover, in the embodiment described above, the pulse signals with A and B phases output from the LF rotary encoder 22 may also be multiplied by 2 by providing the multiplied pulse generating section 36 in the LF rotary encoder processing section 35.

That is, the invention may be applied to all kinds of encoders which output pulse signals according to the travel distance of an object to be detected regardless of the types of encoders, specifically, regardless of whether an output source of an encoder signal is a rotary encoder or a linear encoder and whether or not the encoder is an optical encoder or an encoder using a different method (for example, a magnetic method).

In particular, if the invention is applied to the rotary encoder, it is possible to improve the resolution without increasing the number of slits of an encoder wheel. Accordingly, it is also possible to reduce the size of the encoder wheel while increasing the resolution of an encoder.

What is claimed is:

1. An encoder signal processor which processes a pulsed encoder signal output from an encoder in accordance with a travel distance of an object to be detected, comprising:
    an increasing and decreasing wave generating unit that generates an increasing and decreasing wave, which increases when the encoder signal is at one of a high level and a low level and decreases when the encoder signal is at the other level, based on the encoder signal output from the encoder;
    an intermediate pulse signal generating unit that generates a binarized intermediate pulse signal, of which logic is inverted for every predetermined timing in an increasing period and every predetermined timing in a decreasing period of the increasing and decreasing wave, based on the increasing and decreasing wave generated by the increasing and decreasing wave generating unit; and
    a multiplied pulse signal generating unit that generates a multiplied pulse signal, which is a signal obtained by multiplying the encoder signal by 2, by performing exclusive-OR operation between the encoder signal output from the encoder and the intermediate pulse signal generated by the intermediate pulse signal generating unit.

2. The encoder signal processor according to claim 1, wherein the increasing and decreasing wave generating unit includes an integrating circuit which converts the encoder signal into the increasing and decreasing wave.

3. The encoder signal processor according to claim 2, wherein the integrating circuit is an active circuit, which has an active element, and converts the encoder signal into the increasing and decreasing wave with a triangular wave shape.

4. The encoder signal processor according to claim 1, further comprising:
    an offset unit that offsets the encoder signal output from the encoder so that a middle value of the amplitude of the encoder signal is set to 0V,
    wherein
    the increasing and decreasing wave generating unit is configured to generate the increasing and decreasing wave based on the encoder signal after being offset by the offset unit, and
    the intermediate pulse signal generating unit generates the intermediate pulse signal of which logic is inverted for every zero cross timing which is a timing at which the increasing and decreasing wave generated by the increasing and decreasing wave generating unit is set to 0V.

5. The encoder signal processor according to claim 4, further comprising:
    a DC component removing unit that removes a DC component from the increasing and decreasing wave generated by the increasing and decreasing wave generating unit,
    wherein
    the intermediate pulse signal generating unit generates the intermediate pulse signal based on the increasing and decreasing wave from which the DC component has been removed by the DC component removing unit.

6. The encoder signal processor according to claim 1, further comprising:

a DC component removing unit that removes a DC component from the increasing and decreasing wave generated by the increasing and decreasing wave generating unit, wherein the intermediate pulse signal generating unit generates the intermediate pulse signal, of which logic is inverted for every zero cross timing which is a timing at which the increasing and decreasing wave is set to 0V, based on the increasing and decreasing wave from which the DC component has been removed by the DC component removing unit.

7. An encoder signal processor comprising:

the encoder signal processor according to claim 1 as an unit signal processor, wherein a multiplied pulse signal, which is a signal obtained by multiplying the encoder signal output from the encoder by $2^n$, is generated by connecting the plurality of unit signal processors to each other in n stages (where, n is a natural number).

8. An encoder signal processing method of processing a pulsed encoder signal output from an encoder in accordance with a travel distance of an object to be detected, comprising steps of:

an increasing and decreasing wave generation step of generating an increasing and decreasing wave, which increases when the encoder signal is at one of a high level and a low level and decreases when the encoder signal is at the other level, based on the encoder signal output from the encoder;

an intermediate pulse signal generation step of generating a binarized intermediate pulse signal, of which logic is inverted for every predetermined timing in an increasing period and every predetermined timing in a decreasing period of the increasing and decreasing wave, based on the increasing and decreasing wave generated in the increasing and decreasing wave generation step; and a multiplied pulse signal generation step of generating a multiplied pulse signal, which is a signal obtained by multiplying the encoder signal by 2, by performing exclusive-OR operation between the encoder signal output from the encoder and the intermediate pulse signal generated in the intermediate pulse signal generation step.

9. A transport apparatus comprising:

a transport mechanism that includes a motor and transports a transport object by applying a rotational driving force of the motor to the transport object;

an encoder that outputs a pulsed encoder signal in accordance with a travel distance of the transport object;

the encoder signal processor according to claim 1 for processing the encoder signal output from the encoder;

a transport state detecting unit that detects at least one of the position and speed of the transport object based on the multiplied pulse signal generated by the encoder signal processor; and a control unit that is configured to perform feedback control of the transport of the transport object, which is performed by the motor, based on a detection result of the transport state detecting unit.

10. The transport apparatus according to claim 9, wherein the transport state detecting unit performs the detection based on the encoder signal output from the encoder during a predetermined period after the transport of the transport object is started, and the transport state detecting unit performs the detection based on the multiplied pulse signal, which is generated by the multiplied pulse signal generating unit, after the predetermined period is elapsed.

* * * * *